United States Patent
Eliáš et al.

(10) Patent No.: US 9,262,547 B2
(45) Date of Patent: Feb. 16, 2016

(54) SYSTEM AND METHOD FOR DYNAMIC CACHING

(71) Applicants: Filip Eliáš, Vysni Lhoty (CZ); Filip Nguyen, Brno (CZ)

(72) Inventors: Filip Eliáš, Vysni Lhoty (CZ); Filip Nguyen, Brno (CZ)

(73) Assignee: RED HAT, INC., Raleigh, NC (US)

( * ) Notice: Subject to any disclaimer, the term of this patent is extended or adjusted under 35 U.S.C. 154(b) by 502 days.

(21) Appl. No.: 13/754,619

(22) Filed: Jan. 30, 2013

(65) Prior Publication Data

US 2014/0215000 A1    Jul. 31, 2014

(51) Int. Cl.
*G06F 15/167* (2006.01)
*G06F 17/30* (2006.01)
*H04L 29/08* (2006.01)

(52) U.S. Cl.
CPC .... *G06F 17/30902* (2013.01); *G06F 17/30575* (2013.01); *G06F 17/30584* (2013.01); *H04L 29/0854* (2013.01); *H04L 29/08729* (2013.01); *H04L 67/1095* (2013.01); *G06F 2212/285* (2013.01); *G06F 2212/286* (2013.01)

(58) Field of Classification Search
CPC ............. G06F 17/30905; G06F 17/30575; G06F 17/30584; G06F 2212/285; G06F 2212/286; H04L 29/08729; H04L 29/0854; H04L 67/1095
USPC .......... 709/224, 223, 201, 212–216, 217–219
See application file for complete search history.

(56) References Cited

U.S. PATENT DOCUMENTS

| | | | |
|---|---|---|---|
| 6,480,834 B1* | 11/2002 | Engle et al. | |
| 6,529,921 B1* | 3/2003 | Berkowitz | G06F 17/30578 707/E17.007 |
| 6,799,214 B1* | 9/2004 | Li | 709/226 |
| 6,934,727 B2* | 8/2005 | Berkowitz | G06F 17/30578 707/999.006 |
| 7,363,332 B2* | 4/2008 | Berkowitz | G06F 17/30578 707/639 |
| 7,516,165 B2* | 4/2009 | Berkowitz | G06F 17/30578 |
| 7,552,223 B1* | 6/2009 | Ackaouy et al. | 709/229 |
| 2003/0105768 A1* | 6/2003 | Berkowitz | G06F 17/30578 |
| 2003/0172054 A1* | 9/2003 | Berkowitz | G06F 17/30578 |
| 2005/0091240 A1* | 4/2005 | Berkowitz | G06F 17/30578 |

* cited by examiner

*Primary Examiner* — Kenneth R Coulter
(74) *Attorney, Agent, or Firm* — Haynes and Boone, LLP (57) ABSTRACT

A system and method of managing cache units includes providing, by a first cache unit, caching services to a first plurality of clients, collecting information associated with a usage of the first cache unit by the first plurality of clients, determining a similarity in cache usage between every pair of clients selected from the first plurality of clients based on information associated with the collected information, selecting a second plurality of clients from the first plurality of clients based on information associated with the determined similarity in cache usage, replicating the first cache unit to create a second and a third cache unit, providing, by the second cache unit, caching services to the second plurality of clients, and providing, by the third cache unit, caching services to one or more third clients selected from the first plurality of clients, each of the third clients not being in the second plurality of clients.

20 Claims, 5 Drawing Sheets

| Usage | datom | | | |
|---|---|---|---|---|
| client | 1 | 2 | ... | m |
| 1 | U(1,1) | U(1,2) | ... | U(1,m) |
| 2 | U(2,1) | U(2,2) | ... | U(2,m) |
| ... | ... | ... | ... | ... |
| n | U(n,1) | U(n,2) | ... | U(n,m) |

SYSTEM AND METHOD FOR DYNAMIC CACHING

BACKGROUND

The present disclosure relates generally to computing systems, and more particularly to dynamic caching.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computing systems generally include one or more types of storage such as RAM, disk drives, solid-state drives, and the like. The storage may be used for executable code and/or data that may be retrieved, manipulated, or stored by the executable code. Different types of storage vary in size, speed, and cost. Typically, larger memories and faster memories are more expensive, often considerably so. Consequently, computing systems may have many different varieties of storage arranged in a cooperative and/or hierarchical fashion. In addition, as computing systems become more and more distributed, the distances both physically and in computer networking terms between the sources of data and the consumers of that data may be quite large. This may add complexity to the data retrieval process. It may additionally increase the time required to retrieve data from a distant system as well as the relative cost as more and more processors and/or subsystems may be required to handle the data before it can be delivered. Various strategies are often used to improve the data retrieval process. One such strategy is the use of caching. In caching a faster and/or more local storage unit (i.e., a cache) may be placed between the source of stored information and the consumer of that information. The cache may contain copies of some of the stored information and the consumer of that information may access that information from the copy in the cache rather than from the actual source of the stored information.

Accordingly, it would be desirable to provide improved caching systems and methods. It would also be desirable to provide improved caching systems and methods that may adapt dynamically to the usage patterns of the caching system.

SUMMARY

According to one embodiment, a method of managing cache units includes providing, by a first cache unit, caching services to a first plurality of clients, collecting information associated with a usage of the first cache unit by the first plurality of clients, determining a similarity in cache usage between every pair of first and second clients selected from the first plurality of clients based on at least information associated with the collected information, selecting a second plurality of clients from the first plurality of clients based on at least information associated with the determined similarity in cache usage, replicating the first cache unit to create a second cache unit and a third cache unit, providing, by the second cache unit, caching services to the second plurality of clients, and providing, by the third cache unit, caching services to one or more third clients selected from the first plurality of clients, each of the third clients not being in the second plurality of clients.

According to another embodiment, a non-transitory machine-readable medium including a first plurality of machine-readable instructions which when executed by one or more processors associated with a plurality of cache units are adapted to cause the one or more processors to perform a method including providing, by a first cache unit, caching services to a first plurality of clients, collecting information associated with a usage of the first cache unit by the first plurality of clients, determining a similarity in cache usage between every pair of first and second clients selected from the first plurality of clients based on at least information associated with the collected information, selecting a second plurality of clients from the first plurality of clients based on at least information associated with the determined similarity in cache usage, replicating the first cache unit to create a second cache unit and a third cache unit, providing, by the second cache unit, caching services to the second plurality of clients, and providing, by the third cache unit, caching services to one or more third clients selected from the first plurality of clients, each of the third clients not in the second plurality of clients.

According to yet another embodiment, a system for managing cache units includes a first cache unit to provide caching services to a first client, a second client, and a third client, a cache usage table associated with the first cache unit, a first information associated with a first usage of the first cache unit be the first client, a second information associated with a second usage of the first cache unit by the second client, a third information associated with a third usage of the first cache unit by the second client, a first similarity in cache usage between the first usage and the second usage determined using a distance measure, a second similarity in cache usage between the first usage and the third usage determined using the distance measure, a third similarity in cache usage between the second usage and the third usage determined using the distance measure, a second cache unit which is a first replica of the first cache unit, and a third cache unit which is a second replica of the first cache unit. The first information is stored in the cache usage table. The second information is stored in the cache usage table. The third information is stored in the cache usage table. When the first similarity in cache usage represents a higher similarity than both the second similarity in cache usage and third similarity in cache usage, the second cache unit provides caching services to the first client and the second client and the third cache unit provides caching services to the third client.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
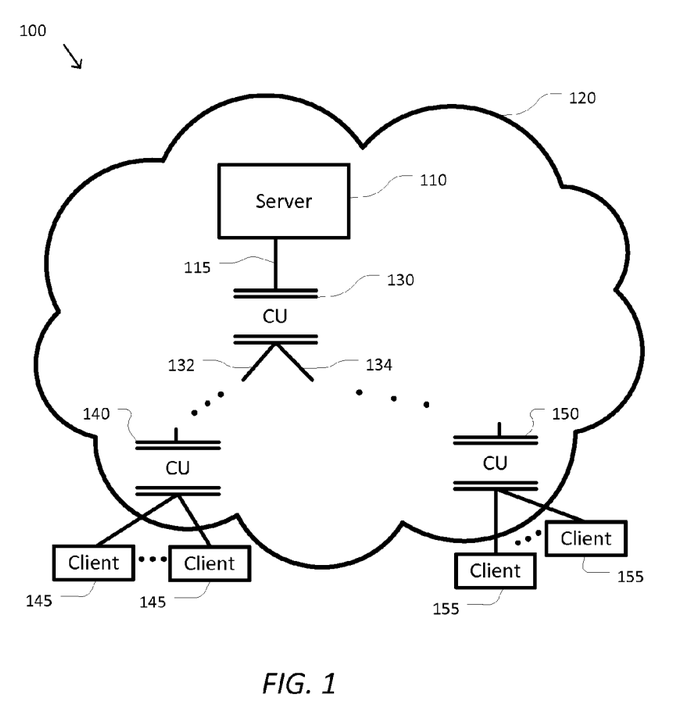
FIG. 1 is a simplified diagram of a distributed computing system according to some examples.

FIG. 1 is a simplified diagram of a distributed computing system 100 according to some examples. As shown in FIG. 1, a distributed computing system 100 may include a server 110. The server 110 may include one or more processors. The server 110 may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server 110 using a computer network 120. This arrangement is consistent with a client-server model of computing. The computer network 120 may be any type of network including a LAN, a WAN, an intranet, the Internet, a cloud, and/or any combination of networks thereof that is capable of interconnecting computing devices and/or computer programs in the distributed computing system 100.

In order to improve the responsiveness of the server 110 to requests for information stored in the storage devices of the server 110, at least some portion of the information stored in the storage devices may be duplicated in a major cache unit 130. The major cache unit 130 may also be referred to as a head cache unit. The major cache unit 130 may be coupled to the server 110 by a network segment 115. The major cache unit 130 may be part of any computing device in the distributed computing system 100 that is capable of supporting caching behavior. As shown in FIG. 1, the major cache unit 130 may be replicated to additional cache units, including cache units 140 and 150. As with the major cache unit 130, the cache units 140 and 150 may be part of any computing device in the distributed computing system 100 that is capable of supporting caching behavior. In some examples, a replicated cache unit may be a duplicate of another cache unit and may include a copy of the same stored information as is stored in the cache unit of which it is a replica. In some examples, the replicated cache unit may include only a copy of a subset of the information stored in the cache unit of which it is a replica. The replicated cache unit (e.g., cache units 140 and 150) may be used to place a copy of the cached information in closer proximity to the clients that may be accessing the cached information. By placing the replicated cache unit in closer proximity to the clients accessing the cached information, the clients may be able to more quickly access the cached information than if the clients had to request the cached information from the major cache unit 130 and/or the server 110 directly. In FIG. 1, the cache unit 140 may be providing caching services to one or more clients 145 and the cache unit 150 may be providing caching services to one or more clients 155. As additionally shown in FIG. 1, the cache unit 140 may be coupled to the major cache unit 130 using the network segment 132 and the cache unit 150 may be coupled to the major cache unit 130 using the network segment 134.

As discussed above and further emphasized here, FIG. 1 is merely an example, which should not unduly limit the scope of the claims. One of ordinary skill in the art would recognize many variations, alternatives, and modifications. According to some examples, the server 110 may include several computing devices in the form of a cluster. According to some examples, the major cache unit 130 may be part of the server 110 and not require the network segment 115 to couple the major cache unit 130 to the server 110. According to some examples, the one or more clients 145 and/or the one or more clients 155 may be hosted on the same and/or different computing devices or located in one or more clusters.

Accordingly, it would be desirable to provide systems and methods for replicating and destroying cache units. It would additionally be desirable to provide systems and methods for dynamically replicating and destroying cache units based on usage patterns of the cache units.

Figure 2:
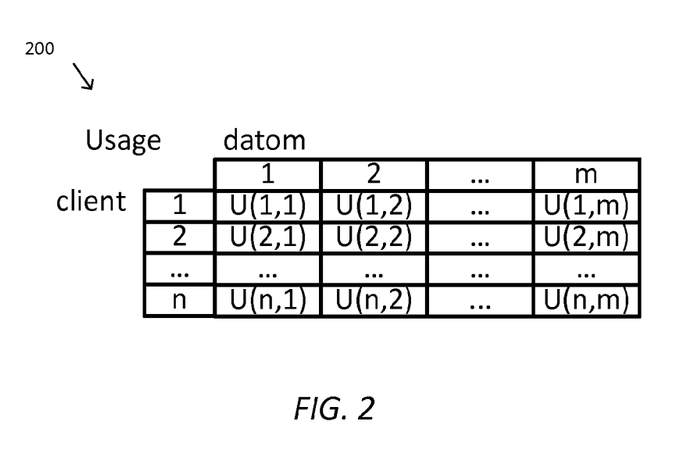
FIG. 2 is a simplified diagram of a usage table of a cache unit according to some examples.

FIG. 2 is a simplified diagram of a usage table 200 of a cache unit according to some examples. As shown in FIG. 2, the usage table 200 may record how various clients (e.g., the clients 145 and/or 155) use information stored in a cache unit (e.g., the cache units 130, 140, and/or 150). The usage table 200 may be organized to record how each client makes use of each datom in the cache unit. Each cache unit may record its own usage table 200 based on the datoms it stores and the clients it serves. Each datom may represent an indexable unit of data that is stored in the cache unit. In some examples, each datom may each be a Java persistence entity, a database row, a name value pair, and/or the like. Merely by way of example, FIG. 2 shows that the datoms may be indexed by the integers 1 through m, although any indexing strategy may be used. In some examples, the datoms may be indexed by an address of the memory location of the datom. In some examples, the datoms may be indexed using a hashing value. According to some examples, it may not be necessary to index every piece of information in the cache unit so that the usage table 200 may record usage for only a portion of the information cached in the cache unit. In similar fashion, each of the clients being served by the cache unit may also be indexed. Merely by way of example, FIG. 2 shows that the clients may be indexed by the integers 1 through n, although any indexing strategy may be used. In some examples, the clients may be indexed by an IP address and port number of the client as used in the TCP/IP networking protocols. In some examples, the clients may be indexed using a hashing value.

As shown in FIG. 2, the usage table 200 may record the usage of the cache unit based on client and datom pairs U(c,d). Each U(c,d) entry may represent the usage of the datom d by the client c. According to some examples, each U(c,d) entry may represent a number of times that client c has accessed datom d over a time window. In some examples, a length of the time window may be a few seconds or shorter. In some examples, the length of the time window may be a few minutes. In some examples, the length of the time window may be fifteen minutes or longer. According to some examples, the length of the time window may be increased or decreased based on usage patterns of the cache unit. According to some examples, the length of the time window may be configurable. According to some examples, each of the U(c,d) entries in the usage table 200 may be normalized.

As discussed above and further emphasized here, FIG. 2 is merely an example, which should not unduly limit the scope of the claims. One of ordinary skill in the art would recognize many variations, alternatives, and modifications. According to some examples, the usage table 200 may be transposed with the clients indexing the columns and the datoms indexing the rows.

Figure 3:
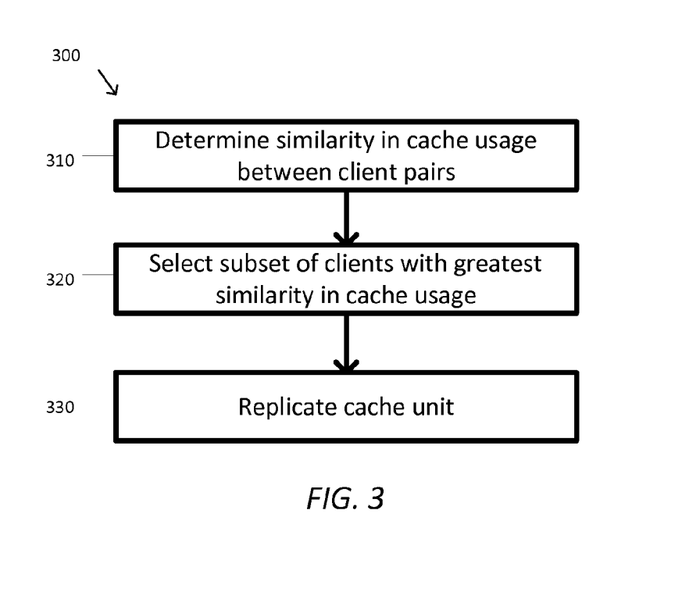
FIG. 3 is a simplified diagram of a method of replicating a cache unit according to some examples.

FIG. 3 is a simplified diagram of a method 300 of replicating a cache unit according to some examples. As shown in FIG. 3, the method 300 includes a process 310 for determining the similarity in cache usage of a cache unit between pairs of clients, a process 320 for selecting a subset of clients with the greatest similarity in cache usage, and a process 330 for replicating the cache unit. According to certain examples, the method 300 of replicating a cache unit can be performed using variations among the processes 310-330 as would be recognized by one of ordinary skill in the art. In some examples, one or more of the processes 310-330 of method 300 may be implemented, at least in part, in the form of executable code stored on non-transient, tangible, machine readable media that when run by one or more processors associated with one or more cache units (e.g., the cache units 130, 140, and/or 150) may cause the one or more processors to perform one or more of the processes 310-330.

At the process 310, a first cache unit (e.g., the cache unit 130, 140, and/or 150) may determine the similarity in cache usage between pairs of clients (e.g., the clients 145 and/or 155). In some examples, for each pair of clients that are associated with the first cache unit, the first cache unit may determine a similarity in usage as recorded in a usage table (e.g., the usage table 200). In some examples, a similarity measure may be used to determine the similarity between each pair of respective rows in the usage table, where each row represents the usage of the first cache unit by a respective client. In some examples, a distance measure, such as a modified version of the least means square or Euclidean distance, may be used to determine the similarity between the cache usage of clients $c_1$ and $c_2$ as shown in Equation 1, where U(c,d) represents the usage of datom d by client c.

$$\Sigma_{d=1}^{m}(U(c_1,d)-U(c_2,d))^2 \qquad \text{Eqn. 1}$$

Equation 1 measures the square of the distance between each of the usage table entries from the rows $c_1$ and $c_2$ as it would be measured in an m-dimensional space between two m dimensional vectors. Under Equation 1, the closer two rows in the usage table are in the m-dimensional space, the more similar they may be. For example, when Equation 1 results in a lower value for clients $c_1$ and $c_2$ than it does for clients $c_3$ and $c_4$, it may be reasonable to conclude that clients $c_1$ and $c_2$ have a more similar usage of the cache unit than clients $c_3$ and $c_4$. In the case where there are n clients, there are n*(n−1)/2 pairs of clients for which the similarity of cache usage may be determined. By determining the similarity between all possible pairs of clients using the first cache unit, it may be possible to determine which clients have the most similar usage.

In some examples, other similarity measures may be used during the process 310. For example, other distance measures may be used such as the sum of absolute differences between the U(c,d) entries. In another example, a similarity relation may be used.

At the process 320, a subset of the clients with the greatest similarity in cache usage may be selected. According to some examples, a cardinality (i.e., the number of clients) in the subset may be a fixed number. For example, the cardinality may be 2. In some examples, the cardinality may be configurable. In some embodiments, the cardinality may be a function of a total number of clients using the first cache unit. For example, the cardinality may be half of the total number of clients rounded down. In another example, the cardinality may be half of the total number of clients rounded up. According to some examples, the subset is selected so that the clients with the most similar cache usage may be grouped together.

According to some examples, when the cardinality of the subset is two, the two clients with the most similar cache usage may be selected into the subset. For example, when the distance measure of Equation 1 is used, the subset may contain the two clients with the lowest overall distance measure.

According to some examples, when the cardinality of the subset is greater than two, a first pair of clients with the most similar cache usage may be selected into the subset. Additional clients may then be selected into the subset one by one based on which of the remaining clients is most similar to one of the clients already selected into the subset. The selection process may continue until the desired cardinality of the subset is reached. For example, when the cardinality of the subset is three and clients $c_1$ and $c_2$ have the most similar cache usage, clients $c_1$ and $c_2$ may be selected into the subset. A third client that has the most similar cache usage to either client $c_1$ or $c_2$ may then be selected as the third member of the subset.

According to some examples, any suitable grouping or clustering approach that relies on the similarity in cache usage may be used to select clients into the subset.

At the process 330, the first cache unit may be replicated. In some examples, the first cache unit may be replicated by creating two or more replicated cache units that contain the same cached information as found in the first cache unit. In other words, each of the replicated cache units includes a copy of all of the cached information. In some examples, the two or more replicated cache units may contain only a copy of a subset of the cached information stored in the first cache unit. As a consequence, any of the replicated cache units may provide caching services to any of the clients. According to some examples, the first cache unit and the replicated cache units may be organized in a tree-like structure. The first cache unit may be the parent to each of the replicated cache units. Each of the replicated cache units may also be described as siblings.

According to some examples, the first cache unit may be replicated into a second cache unit and a third cache unit. The first cache unit may be the parent of the second and third cache units. The second and third cache units may be siblings. The second cache unit may be assigned to provide caching services to the clients in the subset determined in the process 320. The third cache unit may be assigned to provide caching services to the clients of the first cache unit that are not in the subset determined in the process 320.

As discussed above and further emphasized here, FIG. 3 is merely an example, which should not unduly limit the scope of the claims. One of ordinary skill in the art would recognize many variations, alternatives, and modifications. According to some examples, the first cache unit may be replicated into three or more replicated cache units depending upon the number of clients the first cache unit is providing caching services to, the configuration of the first cache unit, and/or the relationships among the various similarities in cache usage determined in the process 310. In some examples, the process 320 may be modified to select multiple subsets from among the clients of the first cache unit. According to some embodiments, the process 300 may be subsequently applied in each of the replicated cache units.

Figure 4:
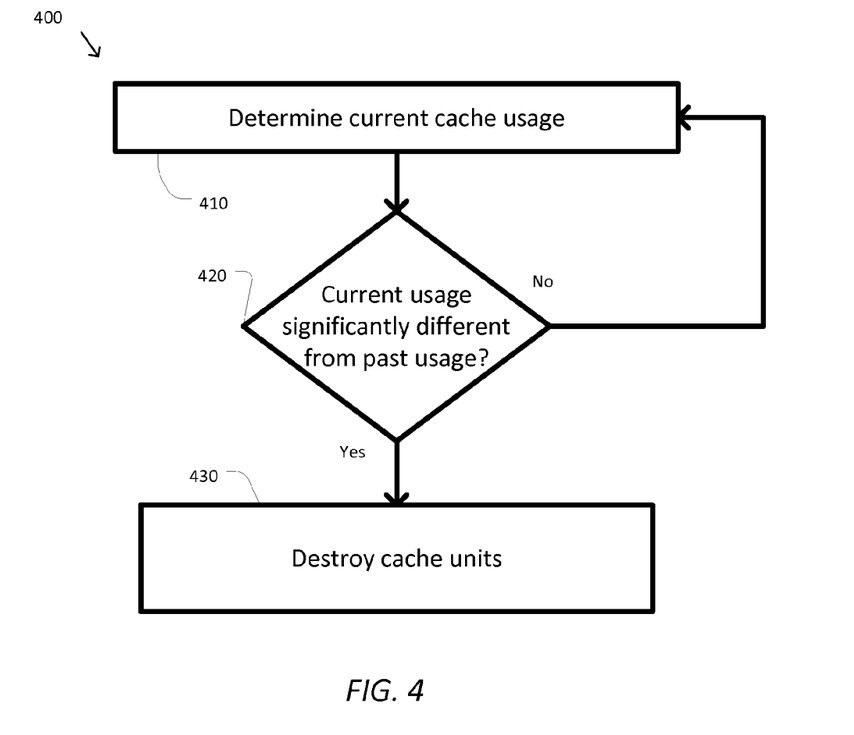
FIG. 4 is a simplified diagram of a method of destroying replicated cache units according to some examples.

FIG. 4 is a simplified diagram of a method 400 of destroying replicated cache units according to some examples. As shown in FIG. 4, the method 400 includes a process 410 for determining the current cache usage for a cache unit, a process 420 for determining whether the current cache usage is significantly different from past cache usage, and a process 430 for destroying cache units. According to certain examples, the method 400 of destroying replicated cache units can be performed using variations among the processes 410-430 as would be recognized by one of ordinary skill in the art. In some examples, one or more of the processes 410-430 of method 400 may be implemented, at least in part, in the form of executable code stored on non-transient, tangible, machine readable media that when run by one or more processors associated with one or more cache units (e.g., the cache units 130, 140, and/or 150) may cause the one or more processors to perform one or more of the processes 410-430.

At the process 410, a current cache usage for a cache unit may be determined According to some embodiments, the current cache usage may be recorded using a cache usage table similar to the usage table 200 as shown in FIG. 2 based on client and datom pairs U(c,d). According to some examples, each U(c,d) entry may represent a number of times that client c has accessed datom d over a recent time window. In some examples, the recent time window ends prior to the start of process 410. In some examples, a length of the recent time window may be a few seconds or shorter. In some examples, the length of the recent time window may be a few minutes. In some examples, the length of the recent time window may be fifteen minutes or longer. According to some examples, the length of the recent time window may be increased or decreased based on usage patterns of the cache unit. According to some examples, the length of the recent time window may be configurable.

At the process 420, a determination may be made whether the current cache usage significantly differs from a past cache usage. According to some examples, the past cache usage may be the cache usage determined to be a current cache usage in a past time window. In some examples, the past time window may be the time window just prior to the recent time window used in the process 410. According to some examples, the current cache usage and the past cache usage may be compared to determine how much the cache usage may have changed. In some examples, a length of the past time window and the length of the recent time window may be the same. In some examples, any significant change in the cache usage may indicate that the cache usage relied upon in a previous replication method 300 may no longer be relied upon to show a similar cache usage among the clients.

According to some examples, a difference between the current cache usage and the past cache usage may be determined using an extended version of the similarity measure used in process 310. For example, the difference may be determined by summing the distance measure of Equation 1 over all of the clients $c_1$ receiving caching services from the cache unit. In some examples, the summed distance may then be normalized based on the number of clients and/or datoms in the cache usage table. According to some examples, the difference may be determined by summing all of the entries in both the current and past cache usage table and comparing the totals to each other.

According to some examples, the difference may be significant when it exceeds a threshold. In some examples, the threshold may be a fixed value. In some examples, the threshold may be configurable. According to some examples, the difference may be significant when a percentage change between the past cache usage and the current cache usage exceeds a relative threshold. In some examples, the relative threshold may be a fixed value. In some examples, the relative threshold may be configurable. In some examples, the relative threshold may be twenty percent or higher. In some examples, the relative threshold may be lower than twenty percent. In some examples, the relative threshold may be five percent or lower.

When the difference is not significant, the method 400 returns to process 410. In some examples, the current cache usage may become the past cache usage for use in a subsequent determination made in process 420. When the difference is significant, the method 400 proceeds to process 430.

At the process 430, cache units are destroyed. According to some examples, the cache unit whose current cache usage is significantly different from its past cache usage and all of the cache unit's sibling cache units are destroyed. In some examples, the parent of the cache unit, from which the cache unit and the sibling cache units were previously replicated, resumes providing caching services to all of the clients of the cache unit and the sibling cache units. According to some examples, the process 430 may reverse the replication of cache units from a previous process 330 by destroying all the replicated copies of a cache unit. According to some examples, a major cache unit may not be destroyed by method 400.

Figure 5A:
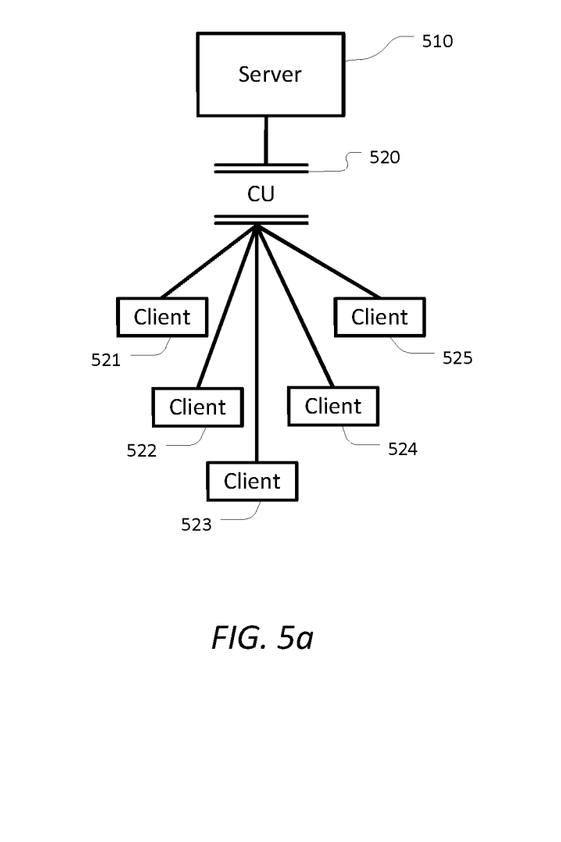
FIGS. 5a-5c are simplified diagrams of replication and destruction of cache units according to some examples.

FIGS. 5a-5c are simplified diagrams of replication and destruction of cache units according to some examples. As shown in FIG. 5a, a server 510 may be supported by a cache unit 520. The cache unit 520 may be a major cache unit. The cache unit 520 may provide caching services to clients 521-525. In some examples, the server 510 may be the server 110. In some examples, the cache unit 520 may be the cache unit 130. In some examples, the clients 521-525 may be the clients 145 and/or 155.

Figure 5B:
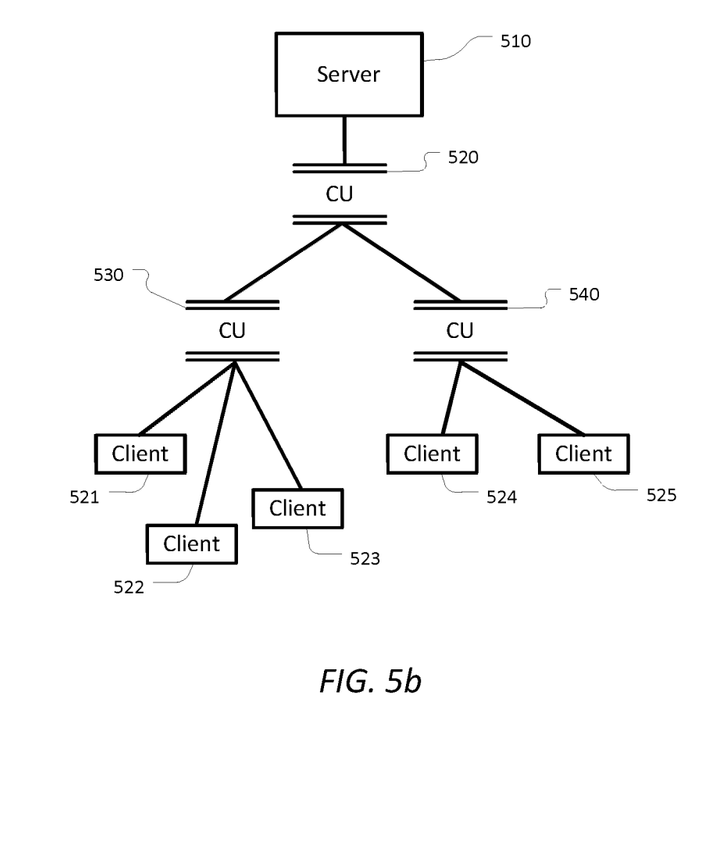

According to some examples, the cache unit 520 may implement the method 300. In some examples, at the process 320, it may be determined that clients 524 and 525 have the most similar cache usage and a subset with a cardinality of two may be selected containing clients 524 and 525. In some examples, at the process 330, the cache unit 520 may be replicated into cache unit 530 and cache unit 540 as shown in FIG. 5b. Cache units 530 and 540 may become sibling cache units with cache unit 520 becoming their parent cache unit. Cache unit 540 may now provide caching services to clients 524 and 525 because both clients 524 and 525 are members of the subset determined in process 320. Cache unit 530 may now provide caching services to clients 521-523 because they are the remaining clients of cache unit 520 that are not members of the subset determined in process 320.

According to some examples, the cache units 530 and 540 may each separately implement the method 400. When either cache unit 530 and/or cache unit 540 determines that there has been a significant difference in their respective current and past cache usages, either may independently apply process 430, destroying both cache units 530 and 540, because they are sibilings, to revert the arrangement of cache units to the arrangement of FIG. 5a.

Figure 5C:
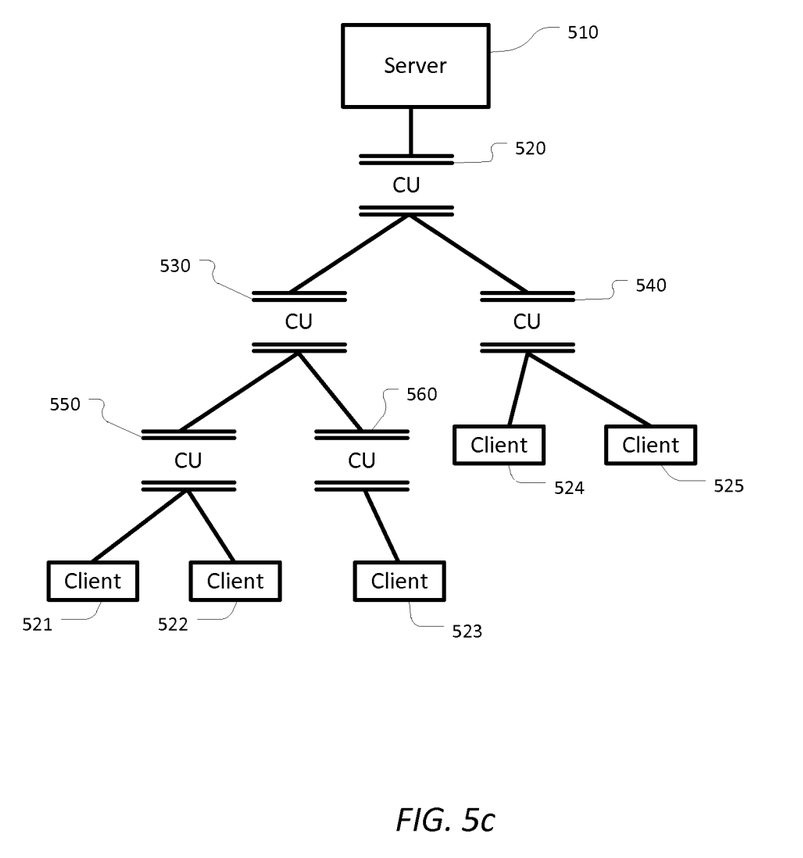

According to some examples, the cache units 530 and 540 may implement the method 300. In some examples, at the process 320 in cache unit 530, it may be determined that clients 521 and 522 have the most similar cache usage and a subset with a cardinality of two may be selected containing clients 521 and 522. In some examples, at the process 330 in cache unit 530, the cache unit 530 may be replicated into cache unit 550 and cache unit 560 as shown in FIG. 5c. Cache units 550 and 560 may become sibling cache units with cache unit 530 becoming their parent cache unit. Cache unit 550 may now provide caching services to clients 521 and 522 because both clients 521 and 522 are members of the subset determined in process 320 in cache unit 530. Cache unit 560 may now provide caching services to client 523 because it is the only remaining client of cache unit 530 that is not a member of the subset determined in process 320 in cache unit 530.

According to some examples, the cache units 550 and 560 may each separately implement the method 400. When either cache unit 550 and/or cache unit 560 determines that there has been a significant difference in their respective current and past cache usages, either may independently apply process 430, destroying both cache units 550 and 560, because they are sibilings, to revert the arrangement of cache units to the arrangement of FIG. 5b.

According to some examples, methods 300 and/or 400 may continue to be implemented in the cache units of FIGS. 5a-5c, replicating and destroying cache units as the cache usage among the clients 521-525 changes. According to some examples, methods 300 and/or 400 may continue to be implemented until the major cache unit (e.g., cache unit 520) is destroyed based on other criteria. For example, the major cache unit may be destroyed when the datoms and/or other information stored in the major cache unit and any of its children are no longer being accessed frequently enough by the clients 521-525.

Some examples of the cache units 110, 130, 140, 150, 520, 530, 540, and/or 550 may include non-transient, tangible, machine readable media that include executable code that when run by one or more processors may cause the one or more processors to perform the processes of methods 300 and/or 400 as described above. Some common forms of machine readable media that may include the processes of methods 300 and/or 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of managing cache units in computing devices, the method comprising:
   providing, by a first cache unit, caching services to a first plurality of clients;
   collecting information associated with a usage of one or more datoms of the first cache unit by the first plurality of clients, wherein each datom of the one or more datoms is an indexable unit of data stored in the first cache unit;
   storing the collected information in a cache usage table;
   indexing the cache usage table by the first plurality of clients and the one or more datoms stored in the first cache unit;
   determining a similarity in cache usage between pairs of clients selected from the first plurality of clients based on at least information associated with the collected information, wherein determining a similarity in cache usage between a pair of clients comprises determining a distance between a first row in the cache usage table associated with a first client in the pair of clients and a second row in the cache usage table associated with a second client in the pair of clients;
   selecting a second plurality of clients from the first plurality of clients based on at least information associated with the determined similarity in cache usage;
   replicating the first cache unit to create a second cache unit and a third cache unit;
   providing, by the second cache unit, caching services to the second plurality of clients; and
   providing, by the third cache unit, caching services to one or more third clients selected from the first plurality of clients, each of the third clients not being in the second plurality of clients.

2. The method of claim 1, further comprising:
   replicating the first cache unit to a fourth cache unit; and
   providing, by the fourth cache unit, caching services to one or more fourth clients selected from the first plurality of clients, each of the fourth clients not being in the second plurality of clients or the one or more third clients.

3. The method of claim 1 wherein the distance is determined using a Euclidean distance or a modified Euclidean distance.

4. The method of claim 1 wherein the distance is determined using a sum of the absolute differences.

5. The method of claim 1 wherein the collected information associated with the usage of the first cache unit is collected during a time window.

6. The method of claim 1 wherein:
   the second plurality of clients comprises a fourth client and a fifth client; and
   a cache usage between the fourth client and the fifth client is a most similar cache usage determined between each pair of clients selected from the first plurality of clients.

7. The method of claim 6 wherein:
   the second plurality of clients further comprises a sixth client; and
   a cache usage between the fourth client and the sixth client is a most similar cache usage determined between:
   the fourth client and any other client selected from the first plurality of clients except for the fifth client; and
   the fifth client and any other client selected from the first plurality of clients except for the fourth client.

8. The method of claim 1 wherein:
   an arrangement of the first cache unit, the second cache unit, and the third cache unit is a tree-like structure;

the first cache unit is the parent of the second cache unit and the third cache unit; and the second cache unit and the third cache unit are siblings.

9. The method of claim 1 wherein:

the first cache unit is a major cache unit; and the first cache unit hosts a cache associated with a server.

10. The method of claim 1, further comprising:

collecting information associated with a past usage of the second cache unit by the second plurality of clients;

collecting information associated with a current usage of the second cache unit by the second plurality of clients;

determining whether a difference between the past usage and the current usage exceeds a threshold;

in response to determining that the difference between the past usage and the current usage exceeds the threshold, destroying the second cache unit and the third cache unit.

11. The method of claim 10 wherein:

the information associated with the past usage is collected during a first time window; and the information associated with the current usage is collected during a second time window, the second time window occurring after the first time window.

12. The method of claim 11 wherein a first duration of the first time window and a second duration of the second time window are the same.

13. The method of claim 11 wherein the threshold is a percentage change between the past usage and the current usage.

14. The method of claim 1, wherein each client of the first plurality of clients is hosted on a separate computing device.

15. The method of claim 1, wherein one or more clients of the first plurality of clients is hosted on a same computing device.

16. The method of claim 1, wherein the cache usage table pairs a first client with a datom of the one or more datoms to form a client datom pair, and wherein the client datom pair is associated with a number of times that the first client has accessed the datom over a time window.

17. A non-transitory machine-readable medium comprising a first plurality of machine-readable instructions which when executed by one or more processors associated with a plurality of cache units are adapted to cause the one or more processors to perform a method comprising:

providing, by a first cache unit, caching services to a first plurality of clients;

collecting information associated with a usage of one or more datoms of the first cache unit by the first plurality of clients, wherein each datom of the one or more datoms is an indexable unit of data stored in the first cache unit;

storing the collected information in a cache usage table;

indexing the cache usage table by the first plurality of clients and the one or more datoms stored in the first cache unit;

determining a similarity in cache usage between pairs of clients selected from the first plurality of clients based on at least information associated with the collected information, wherein determining a similarity in cache usage between a pair of clients comprises determining a distance between a first entry in the cache usage table that is associated with a first client in the pair of clients and a second entry in the cache usage table that is associated with a second client in the pair of clients;

selecting a second plurality of clients from the first plurality of clients based on at least information associated with the determined similarity in cache usage;

replicating the first cache unit to create a second cache unit and a third cache unit;

providing, by the second cache unit, caching services to the second plurality of clients; and providing, by the third cache unit, caching services to one or more third clients selected from the first plurality of clients, each of the third clients not in the second plurality of clients.

18. The non-transitory machine-readable medium of claim 17, further comprising a second plurality of machine-readable instructions which when executed by the one or more processors associated with the plurality of cache units are adapted to cause the one or more processors to perform a method comprising:

collecting information associated with a past usage of the second cache unit by the second plurality of clients;

collecting information associated with a current usage of the second cache unit by the second plurality of clients;

determining whether a difference between the past usage and the current usage exceeds a threshold;

in response to determining that the difference between the past usage and the current usage exceeds the threshold, destroying the second cache unit and the third cache unit.

19. A system for managing cache units, the system comprising:

a first cache unit to provide caching services to a first client, a second client, and a third client, the first client, second client, and third client hosted on one or more computing devices;

a cache usage table associated with the first cache unit;

a first information associated with a first usage of one or more datoms of the first cache unit by the first client, the first information being stored in the cache usage table, wherein each datom of the one or more datoms is an indexable unit of data;

a second information associated with a second usage of the one or more datoms of the first cache unit by the second client, the second information being stored in the cache usage table;

a third information associated with a third usage of the one or more datoms of the first cache unit by the third client, the third information being stored in the cache usage table;

indexing the cache usage table by the first client, the second client, the third client and the one or more datoms;

a first similarity in cache usage between the first usage and the second usage determined using a distance measure, wherein determining the first similarity in cache usage comprises determining a distance between a first row in the cache usage table and a second row in the cache usage table;

a second similarity in cache usage between the first usage and the third usage determined using the distance measure, wherein determining the second similarity in cache usage comprises determining a distance between a first row in the cache usage table and a third row in the cache usage table;

a third similarity in cache usage between the second usage and the third usage determined using the distance measure, wherein determining the third similarity in cache usage comprises determining a distance between a second row in the cache usage table and a third row in the cache usage table;

a second cache unit which is a first replica of the first cache unit; and a third cache unit which is a second replica of the first cache unit;

wherein when the first similarity in cache usage represents a higher similarity than both the second similarity in cache usage and third similarity in cache usage, the second cache unit provides caching services to the first client and the second client and the third cache unit provides caching services to the third client.

20. The system of claim 19, further comprising:

a fourth information associated with a past usage of the second cache unit by the first client and the second client; and a fifth information associated with a current usage of the second cache unit by the first client and the second client;

wherein in response to determining that a difference between the past usage and the current usage exceeds a threshold, the second cache unit and the third cache unit are destroyed.

\* \* \* \* \*